United States Patent [19]

Matsuoka et al.

[11] Patent Number: 4,951,628
[45] Date of Patent: Aug. 28, 1990

[54] IGNITION TIMING CONTROL DEVICE FOR AN INTERNAL COMBUSTION ENGINE

[75] Inventors: Atsuko Matsuoka; Wataru Fukui, both of Himeji, Japan

[73] Assignee: Mitsubishi Denki Kabushiki Kaisha, Tokyo, Japan

[21] Appl. No.: 421,034

[22] Filed: Oct. 13, 1989

[30] Foreign Application Priority Data

Oct. 14, 1988 [JP] Japan .................. 63-257045

[51] Int. Cl.$^5$ .................................. F02P 7/067
[52] U.S. Cl. ........................ 123/414; 123/476; 123/612
[58] Field of Search ............... 123/414, 476, 612, 613, 123/617

[56] References Cited

U.S. PATENT DOCUMENTS

| | | | |
|---|---|---|---|
| 4,442,822 | 4/1984 | Kondo et al. | 123/414 X |
| 4,553,426 | 11/1985 | Capurka | 123/414 X |
| 4,700,305 | 10/1987 | Lotterbach et al. | 364/431.03 |
| 4,760,827 | 8/1988 | Schreiber et al. | 123/414 |
| 4,783,627 | 11/1988 | Pagel et al. | 123/414 X |

*Primary Examiner*—Willis R. Wolfe
*Attorney, Agent, or Firm*—Sughrue, Mion, Zinn, Macpeak and Seas

[57] ABSTRACT

An ignition timing control device for a multi-cylinder internal combustion engine is disclosed, which determines the control timings of the ignition system on the basis of a rotational position signal, the leading and trailing edges of the pulses of which signal correspond to the first and second rotational positions of the crankshaft in relation to respective cylinders, wherein the second rotational position with respect to a specific cylinder is displaced by an offset angle. The pulses corresponding to the specific cylinder are identified by a cylinder identifying means on the basis of duty ratio t/T of the pulses. When the control timings such as the ignition timings are determined on the basis of the second rotational positions of the crankshaft, an offset compensator means compensates for the offset angle of the second rotational position with respect to the specific cylinder in the determination of the control timings, in response to an identification of a pulse corresponding to the specific cylinder by the cylinder identifying means.

5 Claims, 4 Drawing Sheets

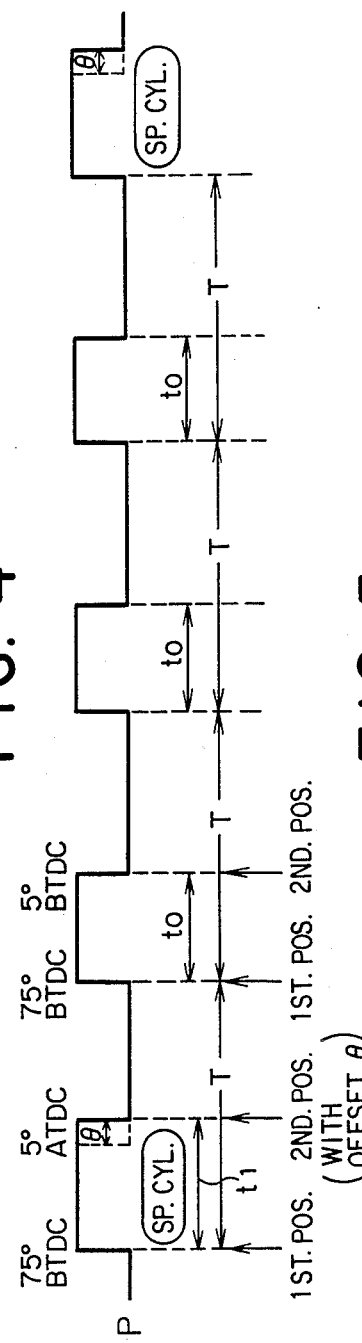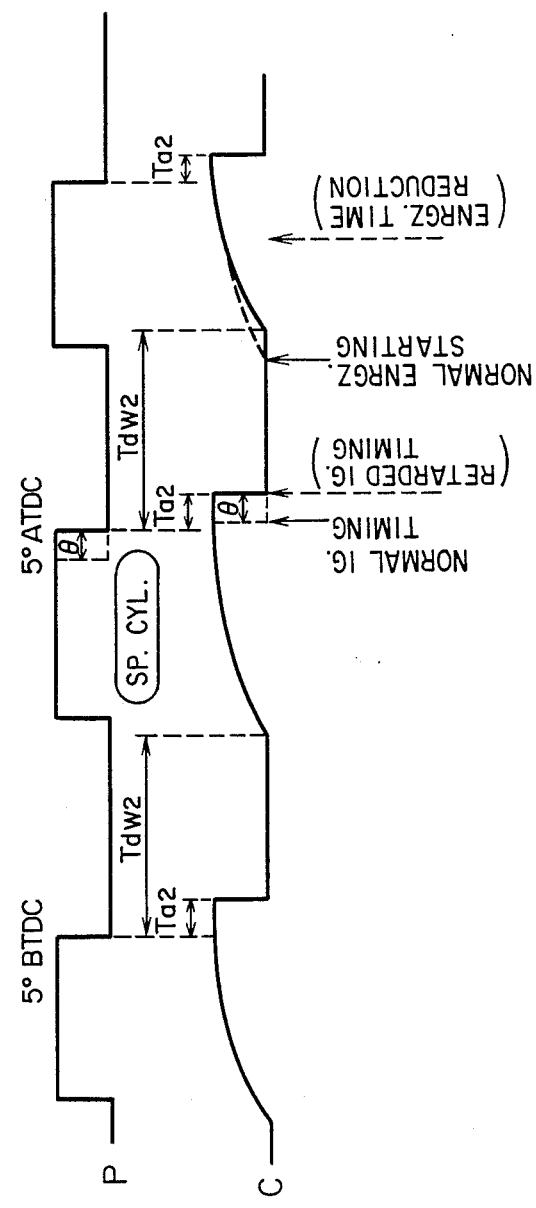

IGNITION TIMING CONTROL DEVICE FOR AN INTERNAL COMBUSTION ENGINE

BACKGROUND OF THE INVENTION

This invention relates to ignition timing control devices for controlling the control timings, such as ignition timings, of the ignition system of an internal combustion engine, and more particularly to such ignition control devices which determines the igntion timings, etc., of a multicylinder engine on the basis of a single rotational position signal representing the position of the crankshaft of the engine in relation to the respective cylinders.

It is becoming increasingly common to utilize microcomputers for the control of the ignition system of an automotive engine. In such case, the rotational position of the crankshaft of the engine is detected by a rotational position signal genrator which, for example, generates pulses whose leading and trailing edges correspond, respectively, to the first and second positions of the crankshaft in relation to the resepctive cylinders. FIG. 1 shows an example of the waveform of a rotaional position signal P generated by such a position signal generator, in the case where the engine is a four-cylinder four-stroke engine. Thus, pulses corresponding to the position of the crankshaft with respect to cylinders No. 1, No. 3, No. 4, and No. 2, for example, are generated successively in that order, during two revolutions (rotation of 720 dgrees) of the crankshaft during which complete cycles of suction, compression, expansion, and exhaution of respective cylinders are completed. The leading edge of each pulse corresponds to the first rotational position of the crankshaft, which, for example, is at 75 degrees before the top dead center (BTDC) between the compression and the expansion stroke with respect to each cylinder; likewise, the trailing edge of each pulse corresponds to the second rotational position of the crankshaft, which is, for example, at 5 degrees before the top dead center between the compression and the expansion stroke of each cylinder. The pules corresponding to the respective cylinders are generated at the pulse repetition period of 180 degrees.

The ignition timings, etc., of respective cylinders are controlled on the basis of the position signal P of FIG. 1; let us describe this control operation.

First, referring to FIG. 2, let us explain the case where the first positions of the crankshaft to which the leading edges of the pulses correspond are utilized as the reference points. In such case, the supply of current C to the ignition coil is controlled as follows. Let $t1$ be the time point at which the leading edge of a pulse is detected; then, the ignition timing $T1$ is given by:

$$T1 = t1 + Ta1,$$

where $Ta1$ is the interval of time which the crandshaft takes to rotate from the first position (e.g., 75 BTDC) to the ignition angle (e.g., 8 degrees ATDC (after top dead center)). On the other hand, the supply of energization current C to the ignition coil is started at the energization starting time $T2$ given by:

$$T2 = t1 + Tdw1$$

where $Tdw1$ is the interval of time which should lapse from the first rotational position of the crankshaft to the starting of the energization of the ignition coil for the purpose of the current ignition.

The case where the control is effected on the basis of the second positions of the crankshaft is shown in FIG. 3. Let $t2$ be the time point at which the trailing edge of a pulse is detected; further let $Ta2$ be the interval of time which the crankshaft takes to rotate from the second rotational position (i.e., 5 degrees BTDC) to the ignition angle (e.g., 8 degrees ATDC); then, the ignition timing $T3$ is given by :

$$T3 = t2 + Ta2.$$

Further, let $Tdw2$ be the interval of time which should lapse from the second rotational position of the crankshaft to the commencement of energization of the ignition coil for the purpose of the next ignition; then, the energization starting timing $T4$ for the next ignition is given by:

$$T4 = t2 + Tdw2.$$

In the case where a rotational position signal P as shown in FIG. 1 is utilized, a separate pulse signal (i.e., a cylinder identifying signal) for determining the correspondance of the pulses with respective cylinders is necessary. Thus, recently, a proposition had been made to utilize a rotational position signal P having a waveform as shown in FIG. 4. In the case of position signal P of FIG. 4, the second position of the crankshaft with respect to a specific cylidner (e.g. cylinder No. 1) is displaced by an offset angle $\theta$ (e.g., 10 degrees) to the retarding direction, so that the trailing edges of the pulses corresponding to the specific cylinder is, for example, 5 degrees after the top dead center (ATDC), instead of at 5degrees before the top dead center (BTDC); hence, the pulses corresponding to the specific cylinder can be identified on the basis of the determination of the duty ratio $t/T$ (i.e., the ratio of the pulse width $t$ to the pulse repetition period $T$).

In the case where the position signal P as shown in FIG. 4 is utilized, the following problem may occur: Let us assume that the second positions of the crankshaft are utilized as reference points in the determination of the control timings such as the ignition timings and the energization stating timings of the ignition coil. Then, as shown in FIG. 5, the ignition timing and the energization starting timing that are determined on the basis of the trailing egde of the pulse corresponding to the specific cylinder are displaced to the retarding direction by an amount corresponding to the offset angle $\theta$. Thus, the ignition timing of the specifc cylinder is retarded by an angle 74 (e.g., 10 degrees) with respect to the normal ignition timing, which retardation reduces the performance of the engine. In addition, the duration of the energization of the ignition coil as started in response to the trailing edge of the pulse corresponding to the specific cylinder is decreased by a length of time corresponding to the offset angle $\theta$, so as to reduce the ignition voltage; this may result in a misfiring.

SUMMARY OF THE INVENTION

It is a primary object of this invention therefore to provide an ignition timing control device which, basing its timing control on a rotaional position signal in which the second position of the crankshaft with respect to a specific cylinder is displaced by a predetermined offset angle, is all the same capable of accurately controlling the control timings of the ignition system in relation to the respective cylinders of a multi-cylinder engine, without occassioning misfirings or abnormal retardings of the ignition timing.

The above object is accomplished in accordance with the principles of this invention in an ignition timing control device which comprises, in addition to a rotational position signal generator, a cylinder identifying means, and a timing determination means, an offset compensator means.

The signal generator generates pulses whose leading and trailing edges correspond to the first and second positions of the crankshaft of the engine in relation to the respective cylinders, wherein the second position of the crankshaft with respect to a specific cylinder (e.g., cylinder No. 1) is displaced by a predetermined offset angle, compared with the second positions of the crankshaft with respect to other cylinders. The cylinder identifying means identifies the pulses corresponding to the specific cylinder; this may be effected on the basis of the determination of the duty ratio of the pulses. When a pulse corresponding to the specifc cylinder is identified by the cylinder identifying means, the offset compensator means determines time intervals which should lapse from the second rotational position of the crankshaft with respect to the specific cylinder to proper control timings of the ignition system, wherein the time intervals are compensated for the offset angle of the second rotational position of the crankshaft with respect to the specific cylinder. The timing determination means determines, when utilizing the second positions of the crankshaft as the reference points, the control timings in accordance with the compensated time intervals as determined by the offset compensator means when a pulse corresponding to the specifc cylinder is detected by the cylinder identifying means.

BRIEF DESCRIPTION OF THE DRAWINGS

The novel features which are belived to be characteristic of this invention are set forth with particularity in the appended claims. This invention itself, however, both as to its organization and method of operation, may best be understood from the following detailed description of the preferred embodiment, taken in conjunction with the accompanying drawings, in which:

FIG. 4 is a view similar to that of FIG. 1, but showing the waveform of a rotational position signal in which the second position of the crankshaft with respect to a specific cylinder is displaced by an offset angle for the purpose of cylinder identification;

FIG. 5 is a diagram showing the waveform of the energization current of the ignition coil as determined conventionally on the basis of the rotational position signal having a cylinder identifying offset;

In the drawings, like reference numerals represent like or corresponding parts, signals, values, etc.

DETAILED DESCRIPTION OF THE PREFERRED ENBODIMENT

Figure 6:
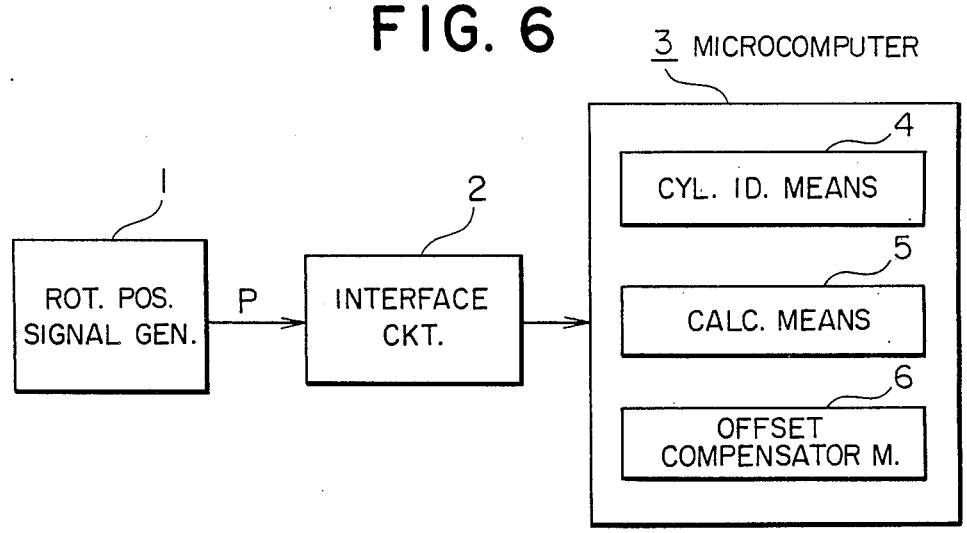
FIG. 6 is a block diagram showing the overall organization of the ignition control device according to this invention.
Figure 7:
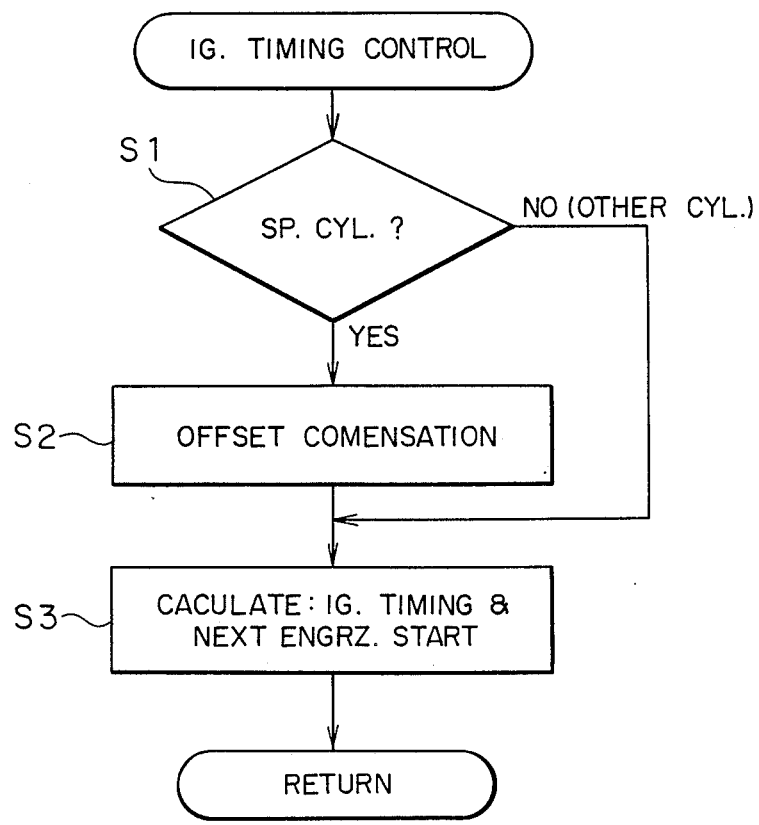
FIG. 7 is a flowchart showing the routine according to which the cylinder identifying offset in the rotational position signal is compensated for according to this invention.
Figure 8:
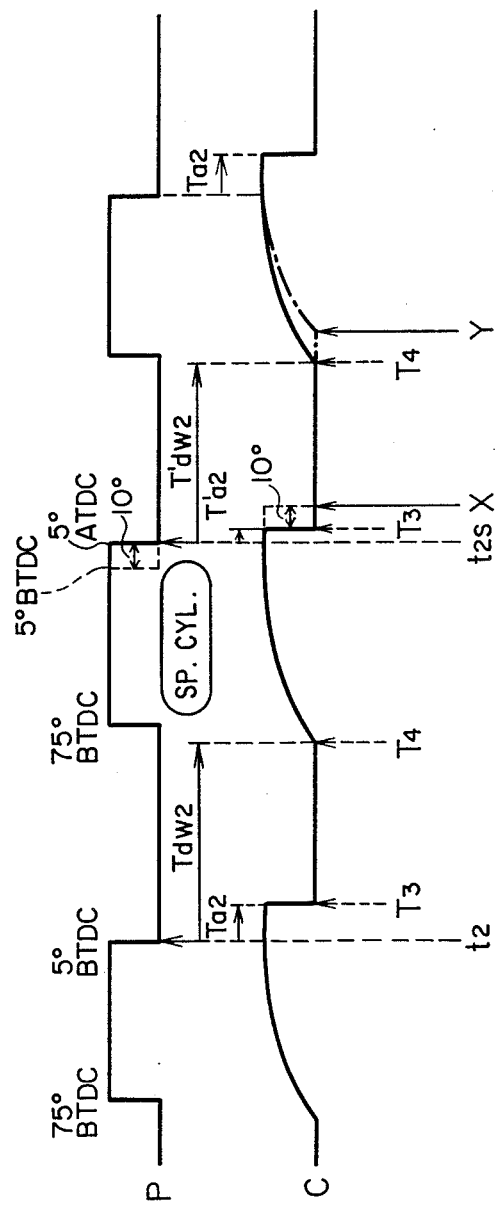
FIG. 8 shows waveforms of the rotational position signal and the energization current of the ignition coil which is controlled according of this invention.

Referring now to FIGS. 6 through 8 of the drawings, an embodiment of this invention is described; reference is also made to FIG. 4.

First, referring to FIG. 6, let us describe the overall organization of the ignition timing control device for a multi-cylinder engine according to this invention. A rotational position signal generator 1 generates a rotaional position signal P, which has a waveform as shown in FIG. 4, in the case where the engine is a four-cylinder engine. The position signal P is supplied, via an interface circuit 2 coupled to the signal generator 1, to the microcomputer 3, which comprises a cylinder identifying means 4, a calculation means 5, and an offset compensator means 6.

Figure 1:
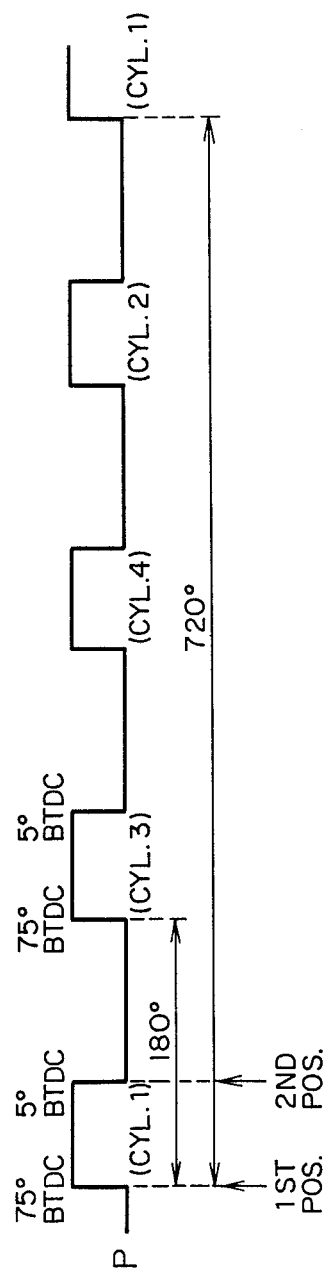
FIG. 1 shows the waveform of a typical rotational position signal for detecting the position of the crankshaft of an internal combustion engine.
Figure 3:
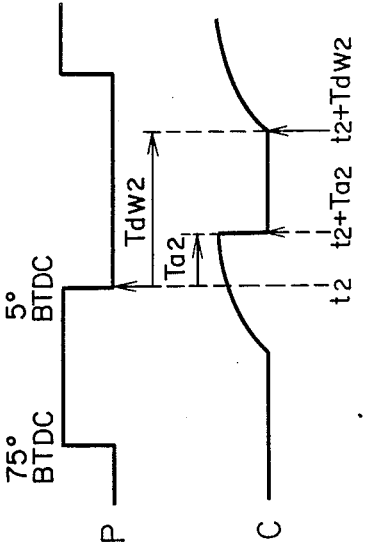
FIGS. 2 and 3 are diagrams showing the method of determination of the control timings of an ignition system on the basis of the signal of FIG. 1.
Figure 2:
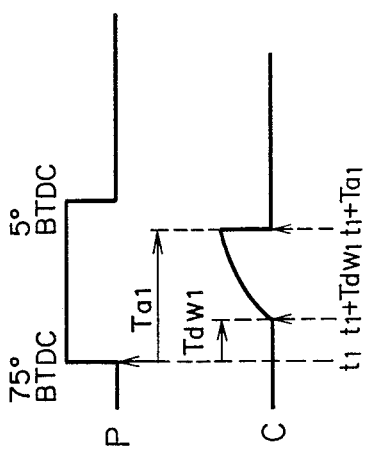

The cylinder identifying means 4 identifies those pulses of the position signal P which correspond to the specific cylinder (e.g., cylinder No. 1) on the basis of the difference in the duty ratio of the pulses; this identification of the specific cylinder is effected as follows. As shown in FIG. 4, the pulse width t1 of the pulse corresponding to the specific cylinder is greater than the pulse width t0 of the other pulses. On the other hand, the pulse repetition periods T as measured between the leading edges consecutive two pulses are the same for all pulses. Thus, the cylinder identifying means 4 first measures the pulse width t of each pulse and the period T between successive two pulses, and calculates the duty ratio $t/T$ therefrom; thereafter, it compares the thus calculated duty ratio $t/T$ with a predetermined level $\alpha$ (which is selected at a value between $t0/T$ and $t1/T$) to determine whether or not $t/T$ is greater than $\alpha$. If the duty ratio $t/T$ is greater than $\alpha$, it is judged that the pulse corresponds to the specific cylinder; otherwise, it is judged that it does not. Further, since the pulses of the rotational position signal P are generated in a predetermined fixed order (an example of which is shown in FIG. 1, according to which pulses corresponding to cylinder Nos. 1, 3, 4, and 2 are generated in that order), the correspondance of the other pulses with the respective cylinders can be established on the basis of the determination of the correspondance of every fouth pulse with the specific cylinder (cylinder No. 1).

When the second rotational positions of the cranksahft are utilized as the reference points, the timing control of the ignition system is effected according to the routine of FIG. 7, with the help of the cylinder identifying means 4 and the offset compensator means 6; the waveform of the energization current C supplied to the ignition coil according to the timing control procedure of FIG. 7 is shown in FIG. 8 (at the second row), together with the corresponding waveform of the rotational position signal P (at the top row). Incidentally, FIG. 8 shows the waveforms P and C in the following case: the first rotational positions of the crankshaft are at 75 degrees before top dead center (BTDC) with respect to the respective cylinders of the engine; the second rotaional positions of the crankshaft, on the other hand, are at 5 degrees BTDC with respect to the cylinders other than the specific cylinder, wherein the second rotational position with respect to the specific cylinder is displaced in the retarding direction by an offset angle $\theta$ of 10 degrees, so as to come to 5 degrees after top dead center (ATDC); further, the proper ignition timing is assumed to be at 8 degrees ATDC with respect to each cylinder.

Now let us describe the routine of FIG. 7. At step S1, it is judged whether the currently received pulse of the rotational position signal P corresponds to the specific cylinder or not; as described above, this judgement is effected by the cylinder identifying means 4 on the basis of the duty ratio t/T of the signal P. When the judgement at step S1 is negative (i.e., when the pulse does not correspond to the specific cylinder), the program proceeds directly to step S3, at which the ignition timing T3 and the next energization starting timing T4 are calculated by the calculation means 5 on the basis of the following equations:

$$T3 = t2 + Ta2, \text{ and}$$

$$T4 = t2 + Tdw2,$$

wherein Ta2 and Tdw2 shown in FIG. 8 by respective arrows are the time lengths as described above by reference to FIG. 5; thus, the time length Ta2, for example, corresponds to the rotational angle of 13 degrees of the crankshaft, since the ignition angle (8 degrees ATDC) is 13 degrees after the second rotational position of the crankshaft (5 degrees BTDC) with respect of the cylinders other than the specific cylinder.

On the other hand, when the judement at step S1 is affirmative (i.e., when the pulse corresponds to the specific cylinder), an offset compensation process is effected at step S2 by the offset compensator means 6; thereafter, at step S3, the ignition timing T3 and the next energization starting timing T4 are determined by the calculation means 5 on the basis of the following equations:

$$T3 = t2s + T'a2, \text{ and}$$

$$T4 = t2s + T'dw2,$$

wherein ts2, T'a2, T'dw2 shown by respective arrows in FIG. 8 are defined as follows:

t2s represents the time point at which the second rotational position of the crankshaft (i.e., 5 degrees ATDC) with respect to the specific cylinder is detected;

T'a2 determined by the offset compensator means 6 at step S2, is the length of time which corresponds to the rotational angle of 3 degrees of the crankshaft, since the second rotational position of the crankshaft with respect to the specific cylinder is, due to the offset angle of 10 degrees, at 5 degrees ATDC, from which the proper ignition timing (at 8 degrees ATDC) is 3 degrees ahead; and T'dw2, also determined by the offset compensator means 6 at S2, is the time length that is shorter than the time length Tdw2 (the value utilized when the judgement at step S1 is negative) by an amount corresponding to the angle of the offset angle of 10 degrees.

Thus, according to this invention, the abnormal retardation of the ignition timing, as indicated by an arrow X in FIG. 8, which occurs in the case of conventional ignition timing control, is corrected; further, the erroneous energization starting timing, as indicated by an arrow Y in the same figure, which also occurs in the case of conventional ignition timing control and may lead to a misfiring, is adjusted.

In the above, description has been made of the particular embodiment of this invention; however, it will be understood that many modifications may be resorted to without departing from the spirit thereof; the appended claims are contemplated to cover any such modifications as fall within the true spirit and scope of this invention.

What is claimed is:

1. An ignition timing control device for controlling control timings of an ignition system of a multi-cylinder internal combustion engine, comprising:

a signal generator means, operatively coupled to a crankshaft of the internal combustion engine, for generating pulses whose leading and trailing edges correspond to first and second rotational positions of the crankshaft of the internal combustion engine with respect to respective cylinders thereof, said second positions occurring after respective first positions in a neighborhood of a top dead center between a compression stroke and a combustion stroke of respective cylinders, said first positions of the crankshaft being equal to each other with respect to all the cylinders of the engine, and said second positions of the crankshaft being equal to each other with respect to the cylinders except for a predetermined specific cylinder, wherein the second rotational position of the crankshaft with respect to the predetermined specific cylinder is displaced by an offset angle, compared with the second rotational positions of the crankshaft with respect to the other cylinders;

cylinder identifying means, coupled to said signal generator means for identifying those pulses of said signal genator means whose leading and trailing edges correspond to the first and second rotational positions of the crankshaft with respect to said specific cylinder;

offset compensator means, coupled to said cylinder identifying means, for determining, in response to an identification of the specific cylinder by the cylinder identifying menas, time intervals that should lapse from the second rotational position of the crankshaft with respect to the specific cylinder to normal control timings of the ignition system, wherein said time intervals are compensated for the offset angle of the second rotational position with respect to the specific cylinder; and timing determination means, coupled to said signal generator means, cylinder identifying means, and said offset compensator means, for determining the control timings of the ignition system with said first and second rotational positions of the crankshaft as reference points, wherein said timing determination means determines, in cases where the second rotational positions of the crankshaft with respect to respective cylinders are utilized as reference points, the control timings in accordance with the compensated time intervals determined by said offset compensator means in response to an identification of a pulse corresponding to said specific cylinder by said cylinder identifying means.

2. An ignition timing control device as claimed in claim 1, wherein said cylinder indentifying means comprises:

duty ratio determining means, for calculating a ratio of a pulse width of a pulse of the signal generator means to a period between leading edges of two successive pulses thereof; and comparison means, coupled to said duty ratio determining means, for comparing to a predetermined level the duty ratio determined by the duty ratio determining means, wherein pulses having said duty ratio greater than said predetermined level are judged to be those corresponding to the specific cylinder.

3. An ignition timing control device as claimed in claim 1, wherein said control timings comprise ignition timings of respective cylinders of the internal combustion engine.

4. An ignition timing control device as claimed in claim 3, wherein said control timings further comprise energization starting timings of an ignition coil of the ignition system of the internal combustion engine.

5. An ignition timing control device as claimed in claim 1, wherein said second position of the crankshaft with respect to the specific cylinder is displaced by an offset angle in the retarding direction, compared with the second rotational positions of the crankshaft with respect to the other cylinders.

* * * * *